US012793680B2

(12) United States Patent
Yamaguchi

(10) Patent No.: US 12,793,680 B2
(45) Date of Patent: Nov. 10, 2026

(54) KEYBOARD DEVICE FOR KEYBOARD INSTRUMENT

(71) Applicant: KABUSHIKI KAISHA KAWAI GAKKI SEISAKUSHO, Hamamatsu (JP)

(72) Inventor: Tsutomu Yamaguchi, Hamamatsu (JP)

(73) Assignee: Kabushiki Kaisha Kawai Gakki Seisakusho, Hamamatus (JP)

( * ) Notice: Subject to any disclaimer, the term of this patent is extended or adjusted under 35 U.S.C. 154(b) by 1085 days.

(21) Appl. No.: 17/950,928

(22) Filed: Sep. 22, 2022

(65) Prior Publication Data

US 2023/0100217 A1 Mar. 30, 2023

(30) Foreign Application Priority Data

Sep. 30, 2021 (JP) ................................ 2021-161118

(51) Int. Cl.
*G10H 1/34* (2006.01)

(52) U.S. Cl.
CPC ....... *G10H 1/346* (2013.01); *G10H 2220/221* (2013.01); *G10H 2220/265* (2013.01)

(58) Field of Classification Search
CPC ............. G10H 1/346; G10H 2220/221; G10H 2220/265
USPC ........................................................... 84/644
See application file for complete search history.

(56) References Cited

U.S. PATENT DOCUMENTS

| | | | | |
|---|---|---|---|---|
| 4,488,472 A * | 12/1984 | Kumano | G10C 3/12 | 984/61 |
| 2010/0288103 A1* | 11/2010 | Jones | G10C 3/12 | 84/440 |

FOREIGN PATENT DOCUMENTS

| | | | |
|---|---|---|---|
| JP | S 62-208093 A | 9/1987 |
| JP | H10-340079 | 12/1998 |
| JP | H10340079 A * | 12/1998 |
| JP | 2003-022073 A | 1/2003 |
| JP | 2007-316172 A | 12/2007 |

OTHER PUBLICATIONS

Japanese Office Action dated Apr. 15, 2025 regarding Japanese Patent Application No. 2021-161118 corresponding to U.S. Appl. No. 17/950,928 (4 pages) with English Translation (6 pages).

* cited by examiner

*Primary Examiner* — Jeffrey Donels
*Assistant Examiner* — Philip G Scoles
(74) *Attorney, Agent, or Firm* — Womble Bond Dickinson (US) LLP

(57) ABSTRACT

A keyboard chassis has an upper limit stopper. A key extending a predetermined length in a front-rear direction is disposed on the keyboard chassis. A key support mechanism supports the key from below, and causes, upon depression of the key, the depressed key to operate such that the key pivotally moves about a virtual pivot located rearward of a rear end of the key. An upper limit position regulation portion provided on a lower portion of a front end of the key regulates an upper limit position thereof by contacting the upper limit stopper from below in a key-released state. A key rear-side stopper provided on the keyboard chassis is contacted by a rear end of the depressed key from below before the upper limit position regulation portion contacts the upper limit stopper, when the key returns to its original position before key depression.

3 Claims, 10 Drawing Sheets

KEYBOARD DEVICE FOR KEYBOARD INSTRUMENT

CROSS-REFERENCE TO RELATED APPLICATIONS

This application claims priority to Japanese Patent Application Number 2021-161118, filed on Sep. 30, 2021, the entire content of which is incorporated herein by reference.

BACKGROUND OF THE INVENTION

Field of the Invention

The present invention relates to a keyboard device which is applied to a keyboard instrument, such as an electronic piano, and in which a depressed one of keys operates such that it pivotally moves about a virtual pivot located rearward of a rear end of the key.

Description of the Related Art

Conventionally, as this type of a keyboard device, there has been known, for example, one disclosed in Japanese Laid-Open Patent Publication (Kokai) No. H10-340079 (FIGS. 1 and 2). In this keyboard device, keys extending in a front-rear direction are disposed on an upper portion of a keyboard chassis. Each key has a front end thereof provided with a stopper portion that extends downward and has a lower end bent forward. Further, a rear end of the key is supported by a key support member, and with this, the key is configured to pivotally move downward about a virtual pivot located rearward of the rear end of the key during key depression. Furthermore, a hammer arm is pivotally movably provided below the key such that the hammer arm pivotally moves along with the key depression.

In the keyboard device constructed as above, during key depression, when one of the keys is depressed, the key nearly parallelly moves downward. In this case, the hammer arm below the key is pivotally moved in a predetermined direction by the key being depressed. Further, when the depression of the key is released, the hammer arm pivotally moves in a direction opposite to the above-mentioned direction, and the key pushed upward along with this pivotal movement of the hammer arm returns to its original position where it was before the key depression. In this case, the stopper portion provided at a lower portion of the front end of the key moves into contact with an upper limit stopper provided on the keyboard chassis from below, which blocks further upward movement of the key.

In the above-described keyboard device, in the case where the depressed key returns to its original position, the key is vigorously pushed up by the hammer arm pivotally moving, and consequently the stopper portion on the front end of the key sometimes hits hard against the upper limit stopper. As described above, when the stopper portion of the key hits hard against the upper limit stopper, noise is generated. Of course, by using a relatively soft cushion as the upper limit stopper, it is possible to suppress generation of noise. In this case, however, upper limit positions of a large number of keys arranged side by side in a left-right direction sometimes fail to be aligned to each other. In addition, the hammer arm, upon returning to its original position, is liable to bounce, and accordingly, there is a possibility that the key having returned to its original position does not immediately come to a standstill or even a possibility that mechanical noise is generated from portions of the key and the hammer arm.

SUMMARY OF THE INVENTION

It is an object of the present invention to provide a keyboard device for a keyboard instrument, which, when a depressed key returns to its original position where it was before key depression, is capable of reducing generation of noise and promptly bringing the key to a standstill.

To attain the above object, the present invention provides a keyboard device for a keyboard instrument, including a keyboard chassis having an upper limit stopper, a key extending a predetermined length in a front-rear direction and disposed above the keyboard chassis, and a key support mechanism that is provided in a state engaged with the keyboard chassis, for supporting the key from below, and causes, upon depression of the key, the depressed key to operate such that the key pivotally moves about a virtual pivot located rearward of a rear end of the key, wherein the key includes an upper limit position regulation portion provided on a lower portion of a front end of the key, for regulating an upper limit position of the key by moving into contact with the upper limit stopper from below, in a key-released state, the keyboard device further including a key rear-side stopper provided on the keyboard chassis, for moving into contact with the rear end of the key from below before the upper limit position regulation portion moves into contact with the upper limit stopper, when the key returns to its original position where the key was before the key depression.

With this construction, when the key supported by the key support mechanism from below is depressed, the key pivotally moves about the virtual pivot located rearward of the rear end of the key. In this case, since the depressed key moves downward as a whole, the front end and the rear end of the key are located below their original positions before the key depression. When the key having been depressed is released, thereby returning to its original position where it was before the key depression, the rear end of the key moves into contact with the key rear-side stopper provided on the keyboard chassis from below before the upper limit position regulation portions provided on the lower portion of the front end of the key moves into contact with the upper limit stopper of the keyboard chassis from below. In short, after the rear end of the key moves into contact with the key rear-side stopper, the upper limit position regulation portion of the front end of the key moves into contact with the upper limit stopper. This makes it possible to reduce the speed and impact of the upper limit position regulation portion of the front end of the key when it hits against the key upper limit stopper. Consequently, it is possible not only to largely reduce noise generated by the upper limit position regulation portions hitting against the key upper limit stopper, but also to promptly bring the key having returned to its original position where it was before the key depression to a standstill. In addition, by promptly bringing the key to a standstill, it is possible not only to improve string striking repeatability of the key 2 but also to obtain an excellent touch feeling.

Preferably, the rear end of the key includes a contact surface for moving into contact with the key rear-side stopper in the key-released state, and a protrusion formed to protrude upward from the contact surface.

With the construction of this preferred embodiment, the rear end of the key is provided with the contact surface and the protrusion, and when the contact surface and the protrusion move into contact with the key rear-side stopper from below, the protrusion hits against the key rear-side stopper first, and then the contact surface hits against the key rear-side stopper. More specifically, compared with a case where the contact surface immediately hits against the key rear-side stopper, since the protrusion having an upper surface with a smaller area than that of the contact surface hits against the key rear-side stopper first, whereby it is possible to reduce impact noise generated when the rear end of the key hits against the key rear-side stopper.

More preferably, the protrusion has an upper surface thereof sloped with respect to the contact surface or formed into an arcuate shape convex upward.

With the construction of this preferred embodiment, the upper surface of the protrusion is sloped with respect to the contact surface or is formed into the arcuate shape convex upward, and hence when the protrusion moves into contact with the key rear-side stopper, the upper surface of the protrusion progressively hits against the key rear-side stopper. With this, compared with a case where the whole upper surface of the protrusion simultaneously hits against the key rear-side stopper, it is possible to further reduce impact noise generated when the protrusion hits against the key rear-side stopper.

Preferably, the keyboard device further includes a stopper support plate mounted on an upper portion of a rear end of the keyboard chassis, and the key rear-side stopper is fixed to a front end of a lower surface of the stopper support plate.

With the construction of this preferred embodiment, since the key rear-side stopper is fixed to the front end of the lower surface of the support plate which is mounted on the upper portion of the rear end of the keyboard chassis, it is possible not only to securely mount the key rear-side stopper on the keyboard chassis but also to easily dispose the key rear-side stopper at an appropriate location on the keyboard chassis.

The above and other objects, features, and advantages of the present invention will become more apparent from the following detailed description taken in conjunction with the accompanying drawings.

BRIEF DESCRIPTION OF THE DRAWINGS

FIGS. 1A and 1B are perspective views of a part (one octave section) of a keyboard device for an electronic piano to which the present invention is applied, in which FIG. 1A shows the appearance of the keyboard device and FIG. 1B shows a state in which keys other than a white key and a black key at the left end of the keyboard device are omitted;

FIGS. 4A and 4B are perspective views of the white key and the key support mechanism therefor, in which FIG. 4A shows the white key and the key support mechanism in a connected state and FIG. 4B shows the white key and the key support mechanism in an exploded state;

FIGS. 5A and 5B are perspective views of the black key and the key support mechanism therefor, in which FIG. 5A shows the black key and the key support mechanism in a connected state and FIG. 5B shows the black key and the key support mechanism in an exploded state;

FIGS. 6A and 6B are views useful in explaining operation of the white key in the keyboard device, in which FIG. 6A shows a key-released state and FIG. 6B shows a key-depressed state;

FIGS. 7A and 7B are views useful in explaining operation of the black key in the keyboard device, in which FIG. 7A shows a key-released state and FIG. 7B shows a key-depressed state;

FIGS. 8A and 8B are diagrams showing a rear end of a key of the keyboard device and component parts therearound on an enlarged scale, in which FIG. 8A shows a key-released state and FIG. 8B shows a key-depressed state;

FIGS. 9A and 9B show an appearance of the white key, in which FIG. 9A is a perspective view and FIG. 9B is a right side view.

DETAILED DESCRIPTION OF PREFERRED EMBODIMENTS

Figure 1A:
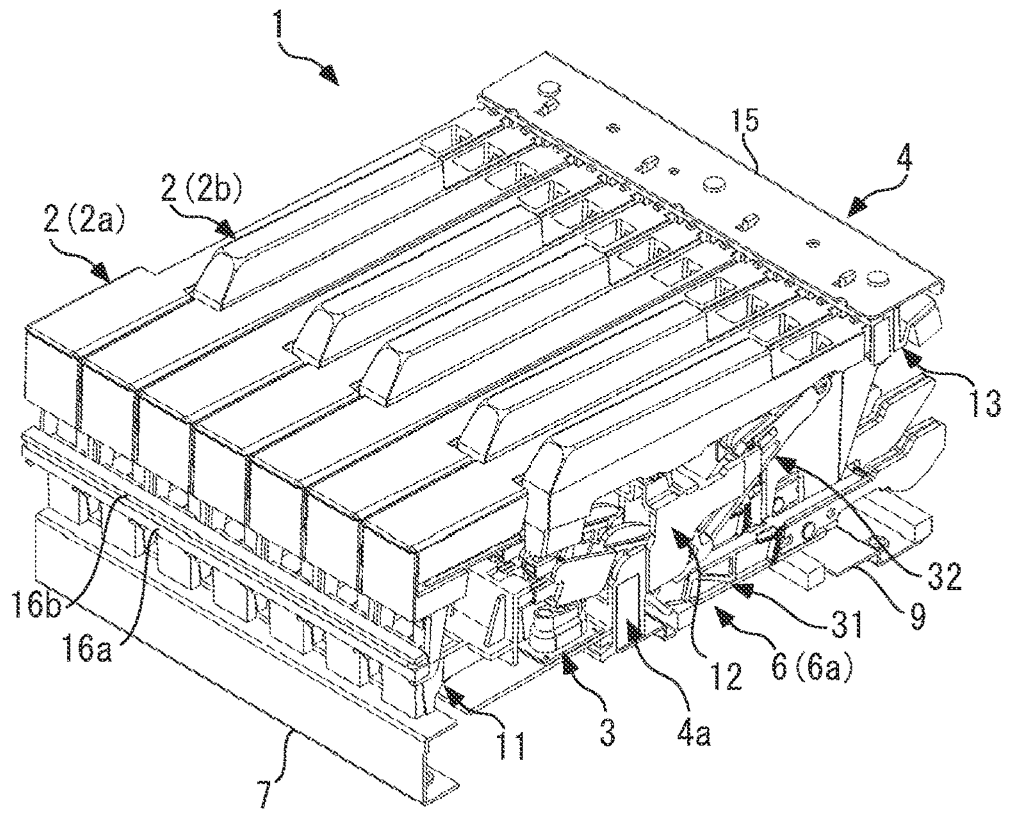

The present invention will now be described in detail with reference to the drawings showing preferred embodiments thereof. FIG. 1A shows only one octave section of a keyboard device 1 for an electronic piano to which the present invention is applied. Note that in the following, a description will be first given of the basic arrangement of the keyboard device 1 and operation thereof, and then of an essential part of the present invention.

Figure 1B:
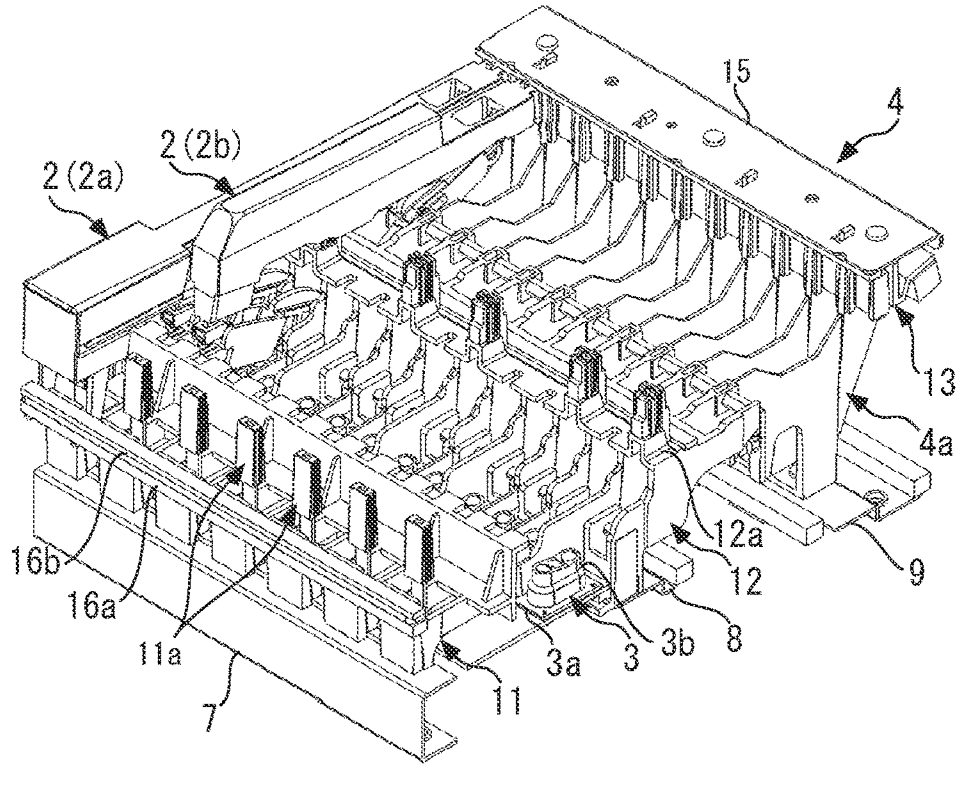
Figure 2:
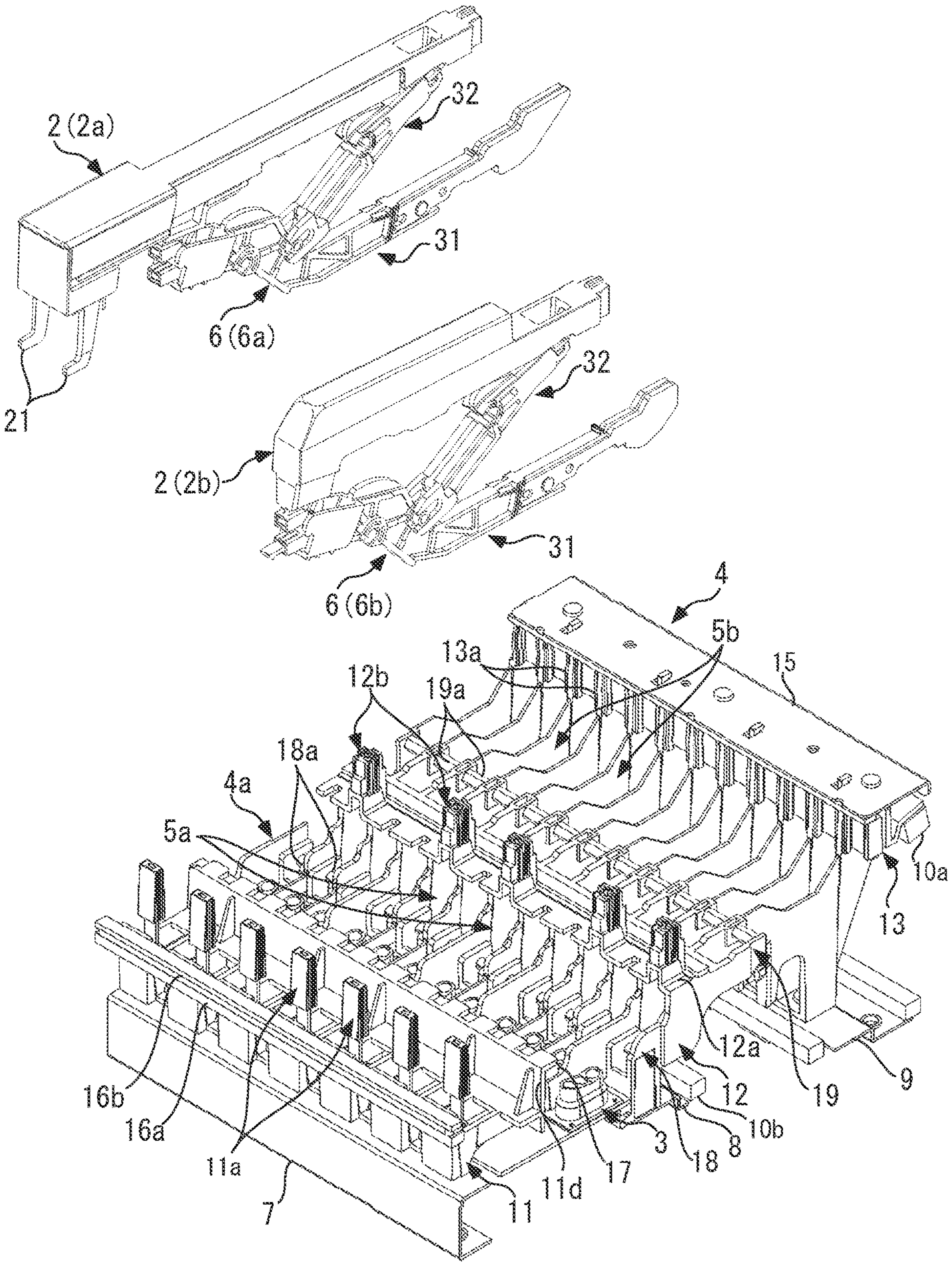
FIG. 2 is a perspective view of the keyboard device shown in FIG. 1B in a state in which the white key and the black key are removed, together with respective key support mechanisms therefor, from a keyboard chassis.

FIG. 1B shows a state of the keyboard device 1 shown in FIG. 1A, in which keys 2 other than a white key 2*a* and a black key 2*b* at the left end of the keyboard device 1 are omitted. FIG. 2 shows a state the keyboard device 1 shown in FIG. 1B in which the white key 2*a* and the black key 2*b* are removed together with respective key support mechanisms 6 therefor, from a keyboard chassis 4.

This keyboard device 1 is comprised of the keyboard chassis 4, the plurality of keys 2 including the white keys 2*a* and the black keys 2*b* and arranged in a state arranged side by side in a left-right direction, the plurality of key support mechanisms 6 each pivotally mounted on the keyboard chassis 4 for supporting an associated one of the keys 2 from below, and key switches 3 each for detecting key depression information of an associated one of the keys 2.

Figure 3A:
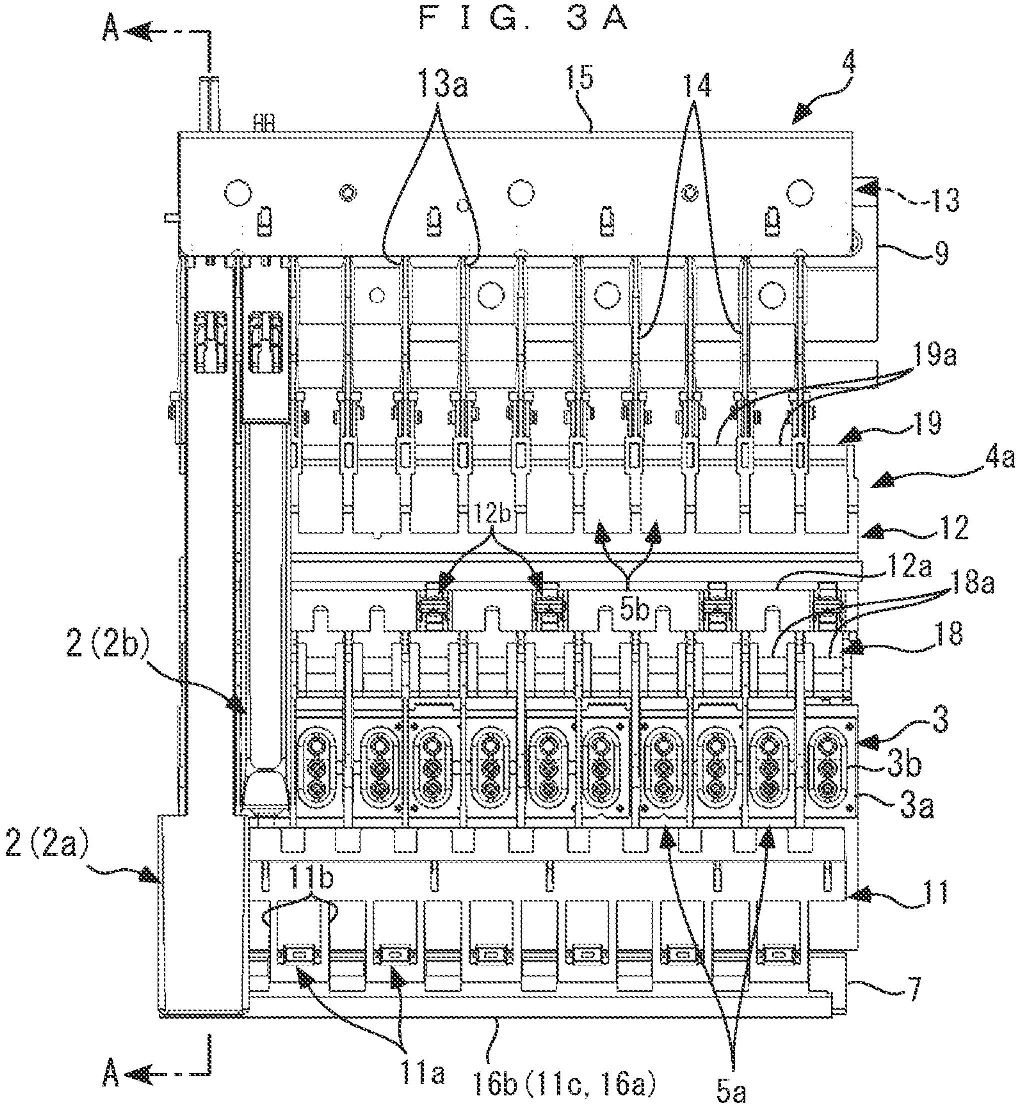
FIG. 3A is a plan view of the keyboard device shown in FIG. 1B
Figure 3B:
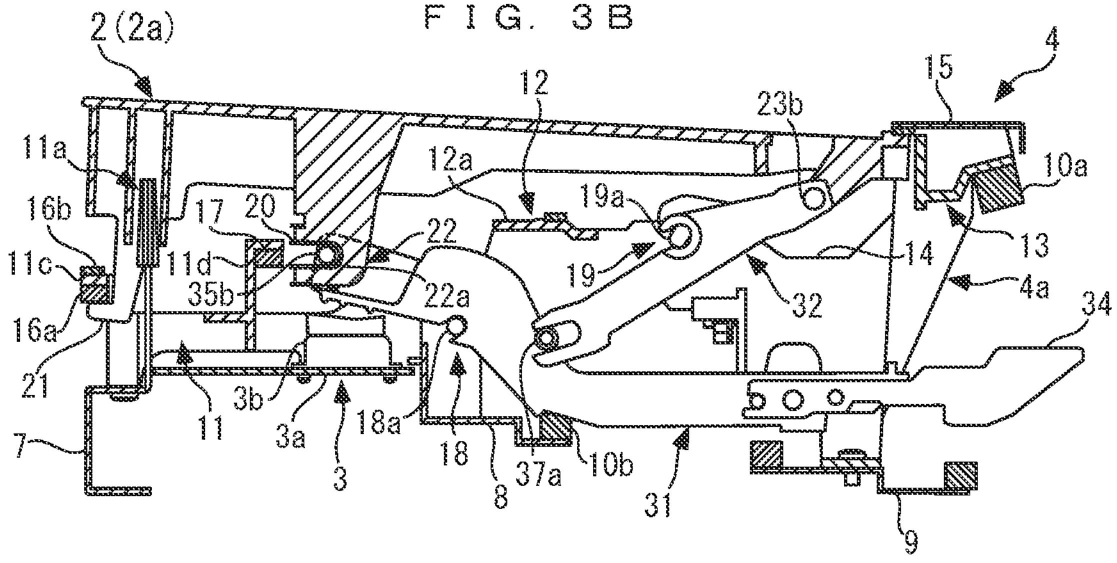
FIG. 3B is a cross-sectional view taken along line A-A of FIG. 3A.

The keyboard chassis 4 includes a chassis body 4*a* formed as a resin molded article which is made e.g. by injection molding of a predetermined resin material (e.g. an ABS resin) into a predetermined shape. As shown in FIGS. 3A and 3B, the chassis body 4*a* has a front portion 11, an intermediate portion 12, and a rear portion 13, each extending in the left-right direction (in a left-right direction as viewed in FIG. 3A) as a whole. The front portion 11, the intermediate portion 12, and the rear portion 13 are integrally formed with each other by a plurality of ribs 14 disposed with a spacing therebetween in the left-right direction and each extending in the front-rear direction. Note that in the following description, the front portion 11, the intermediate portion 12, and the rear portion 13 of the chassis body 4*a* of the keyboard chassis 4 will be referred to as “the chassis front 11”, “the chassis intermediate 12”, and “the chassis rear 13”, respectively.

The chassis front 11 is mainly for guiding the white key 2*a* during depression thereof and restricting the upper limit position and the lower limit position of a front end of the white key 2*a*. On the chassis front 11, there are erected a plurality of white key guides 11*a*, each of which is inserted into each associated one of the white keys 2*a* from below so as to prevent lateral swing of the white key 2*a*, in a state arranged side by side in the left-right direction. Further, the chassis front 11 has engagement holes 11*b* and 11*b*, vertically extending therethrough, which are formed on the left and right sides of each of the white key guides 11*a*, respectively. A pair of left and right upper limit position regulation portions 21 and 21, referred to hereinafter, of the white key 2*a* are engaged with the respective engagement holes 11*b* and 11*b* in a state inserted therethrough. Furthermore, the chassis front 11 has a front end thereof formed with a stopper-mounting portion 11*c* that protrudes forward and extends along the entirety of the chassis body 4*a* in the left-right direction. A key upper limit stopper 16*a* and a key lower limit stopper 16*b* for the white key are mounted on a lower surface and an upper surface of the stopper-mounting portion 11*c*, respectively, such that they extend in the left-right direction. Note that a stopper-mounting portion 11*d* for the black key, which extends along the entirety of the chassis body 4*a* in the left-right direction, is provided at a predetermined location of the chassis front 11, rearward of each white key guide 11*a*, and that a key upper limit stopper 17 for the black key is mounted on the stopper-mounting portion 11*d* such that it extends in the left-right direction.

The chassis intermediate 12 is mainly for guiding the black key 2*b* during depression thereof and swingably supporting a first arm 31 and a second arm 32, described hereinafter, of each of a white key-associated key support mechanism 6*a* and a black key-associated key support mechanism 6*b*. The chassis intermediate 12 has a flat portion 12*a* in the form of a flat plate extending in the left-right direction, and a plurality of black key guides 12*b* erected on the flat portion 12*a* and disposed with an appropriate spacing therebetween in the left-right direction. Each black key guide 12*b* is inserted into an associated one of the black keys 2*b* from below to prevent lateral swing of the black key 2*b*. Further, the chassis intermediate 12 has a front portion thereof provided with a first arm support portion 18 for supporting the first arms 31 of the key support mechanisms 6. The first arm support portion 18 has a plurality of first pivot shafts 18*a* each of which is provided between each adjacent two of the ribs 14 and 14 such that the first pivot shaft 18*a* extends in the left-right direction. The first arms 31 are swingably supported on associated ones of the first pivot shafts 18*a*. Furthermore, the chassis intermediate 12 has a rear portion thereof provided with a second arm support portion 19 for supporting the second arms 32 of the key support mechanisms 6. The second arm support portion 19 has a plurality of second pivot shafts 19*a* each of which is provided between each adjacent two of the ribs 14 and 14 such that the second pivot shaft 19*a* extends in the left-right direction. The plurality of second pivot shafts 19*a* are arranged on the same axis extending in the left-right direction at a location rearward of and higher than the first pivot shafts 18*a*, and the second arms 32 are swingably supported on associated ones of the second pivot shafts 19*a*. Note that a first arm lower limit stopper 10*b* extending along the entirety of the chassis body 4*a* in the left-right direction is provided at a predetermined location of a middle rail 8, referred to hereinafter, disposed below the chassis intermediate 12.

Further, the above-mentioned key switches 3 are provided on a lower portion of the keyboard chassis 4 between the above-described chassis front 11 and chassis intermediate 12. The key switches 3 are formed by a laterally elongated printed circuit board 3*a* extending in the left-right direction, and a plurality of switch bodies 3*b* formed by rubber switches attached to the printed circuit board 3*a* on a key-by-key basis, for being pressed by associated ones of the first arms 31 upon key depression.

The chassis rear 13 is mainly for guiding the keys 2 by their rear ends in the vertical direction while preventing lateral swing of the keys 2 and for restricting the upper limit positions of the rear ends of associated ones of the first arms 31. As shown in FIGS. 2 and 3A, the chassis rear 13 has a plurality of partition walls 13*a* formed with a predetermined spacing therebetween in the left-right direction so as to separate each adjacent two of the keys 2 and 2 from each other. Further, as shown in FIG. 3B, a first arm upper limit stopper 10*a* extending along the entirety of the chassis body 4*a* in the left-right direction is provided at a predetermined location of an upper portion of the chassis rear 13. The first arm upper limit stopper 10*a* and the first arm lower limit stopper 10*b* provided on the chassis intermediate 12 are for restricting the upper limit position and the lower limit position of the first arm 31, respectively, when the first arm 31 having a function as a hammer for adding a touch weight to the key 2 pivotally moves upward and downward. Furthermore, a metal cover plate 15 extending in the left-right direction along the entirety of the chassis body 4*a* and disposed to cover the rear ends of the keys 2 is mounted on the upper portion of the chassis rear 13.

As shown in FIS. 2 and 3A, the chassis body 4*a* of the keyboard chassis 4 constructed as described above is formed with a plurality of first openings 5*a* open upward and forward and a plurality of second openings 5*b* open upward. The first arms 31 of the key support mechanisms 6 are engaged with associated ones of the first pivot shafts 18*a* from outside via the above-mentioned first openings 5*a*, respectively. Further, the second arms 32 are engaged with associated ones of the second pivot shafts 19*a* from outside via the above-mentioned second openings 5*b*, respectively.

Further, in the above-described keyboard chassis 4, a plurality of chassis bodies 4*a* are connected to each other so as to be arranged side by side in the left-right direction, and are each screwed to a front rail 7, the middle rail 8, and a rear rail 9 in a state placed thereon, the rails 7, 8 and 9 each extending in the left-right direction and arranged with a predetermined spacing therebetween in the front-rear direction. The keyboard chassis 4 is fixed to a keybed, not shown, of the electronic piano via the front rail 7 and the rear rail 9.

Figure 4A:
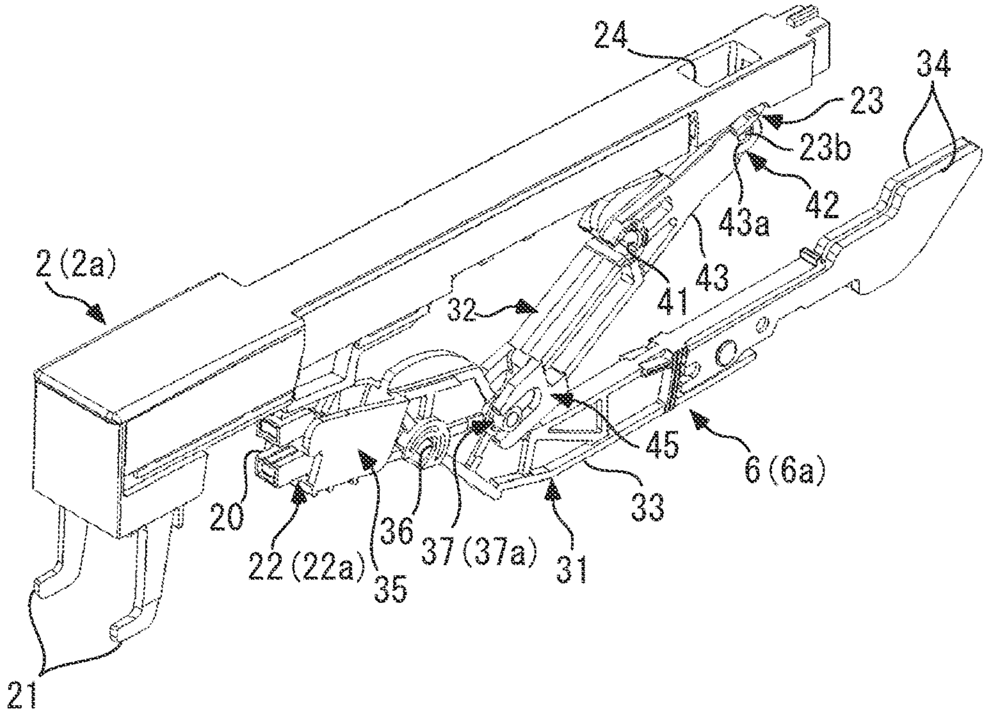
Figure 4B:
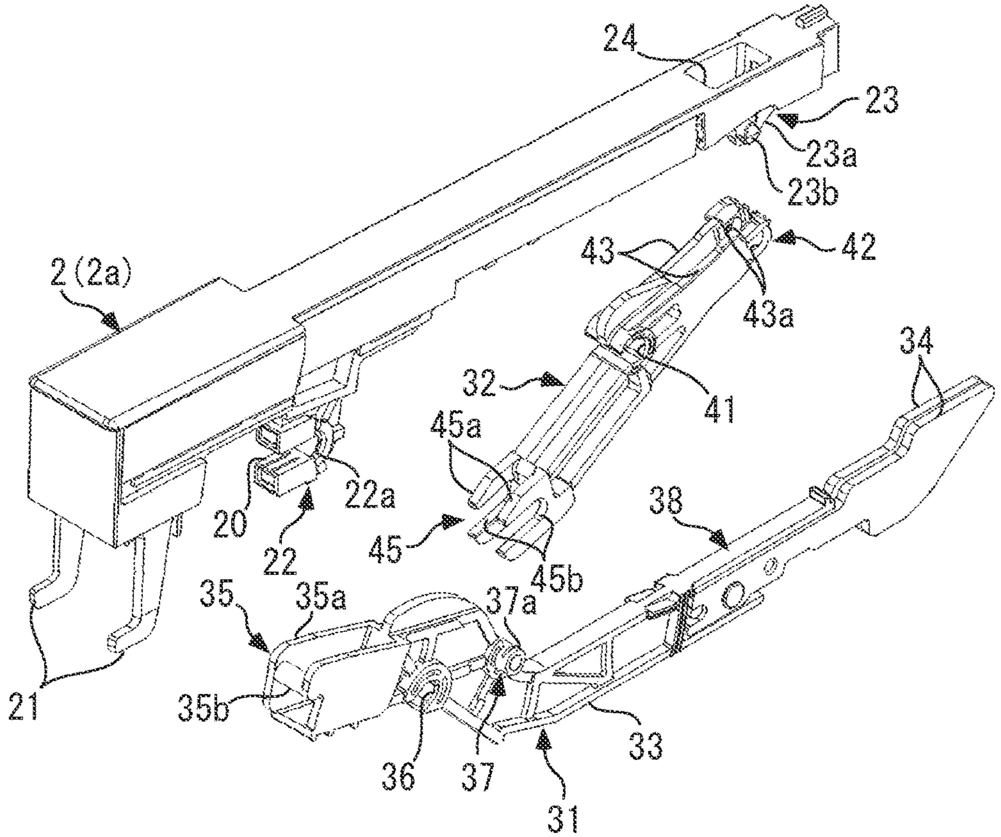

Next, the keys 2 and the key support mechanisms 6 will be described. FIG. 4A shows the white key 2*a* and the key support mechanism 6*a* therefor on an enlarged scale, and FIG. 4B shows them in an exploded state. As shown in FIGS. 4A and 4B, the white key 2*a* is formed e.g. by injection molding of a predetermined resin material (e.g. an AS resin) into a hollow shape which extends a predetermined length in the front-rear direction and opens downward. The white key 2*a* has the front end thereof formed with the pair of left and right upper limit position regulation portions 21 and 21 which protrude downward from respective side walls of the front end of the white key 2*a* and each having a lower end thereof bent forward. As described hereinabove, the left and right upper limit position regulation portions 21 and 21 are engaged with the respective left and right engagement holes 11*b* and 11*b* of the chassis front 11 in a state inserted therethrough.

Further, at a predetermined location of a front portion of the white key 2*a*, rearward of the upper limit position regulation portions 21, there is formed a key front-side connecting portion 22 connected to the first arm 31 of the key support mechanism 6*a*. This key front-side connecting portion 22 includes a connecting recess 22*a* which has a U shape having a slot-like shape in side view and open forward. Further, the connecting recess 22*a* has a key-side noise suppressing member 20 attached thereto, which is formed to cover the whole inner peripheral surface of the connecting recess 22*a*, for suppressing generation of noise when a connecting shaft 35*b*, referred to hereinafter, of the first arm 31 slides in the connecting recess 22*a*.

Furthermore, the white key 2*a* has a rear portion thereof provided with a key rear-side connecting portion 23 connected to the second arm 32 of the key support mechanism 6*a*. The key rear-side connecting portion 23 has a plate-like connecting body portion 23*a* which hangs downward from a laterally central portion of the white key 2*a* and has a predetermined thickness in the left-right direction, and a pair of left and right engagement protrusions 23*b* and 23*b* which coaxially protrude from the left and right side surfaces of the connecting body portion 23*a*, respectively. Further, a rear portion of the white key 2*a* is formed with a tool insertion hole 24 which vertically extends through the rear portion, and is used to insert a predetermined tool from above for disconnecting the white key 2*a* from the second arm 32 of the key support mechanism 6*a* e.g. for maintenance of the keyboard device 1.

On the other hand, the key support mechanism 6*a* includes the first arm 31 and the second arm 32 which are engaged with each other and are connected to the key front-side connecting portion 22 and the key rear-side connecting portion 23 of the white key 2*a*, respectively.

As shown in FIG. 4B, the first arm 31 is comprised of an arm body 33 and two weights 34 and 34 attached to the arm body 33. The arm body 33 is formed as a resin molded article which is made e.g. by injection molding of a predetermined resin material (e.g. polyacetal resin) into a predetermined shape. This arm body 33 extends a predetermined length in the front-rear direction, and has a front end thereof formed with a first arm front-side connecting portion 35 connected to the key front-side connecting portion 22 of the white key 2*a*. The first arm front-side connecting portion 35 includes a box portion 35*a* having a box-like shape open upward and forward, and the connecting shaft 35*b* provided such that it extends in the left-right direction in a state connecting the front-side upper ends of left and right side walls of the box portion 35*a* to each other. The connecting shaft 35*b* is connected to the connecting recess 22*a* of the key front-side connecting portion 22 of the white key 2*a* such that the connecting shaft 35*b* is pivotally movable and is slidable in the front-rear direction.

Further, the arm body 33 has a bearing portion 36 formed at a predetermined location immediately rearward of the first arm front-side connecting portion 35. The bearing portion 36 has an inverted U shape open downward in side view, and is pivotally engaged with the first pivot shaft 18*a* of the keyboard chassis 4. Furthermore, the arm body 33 has a first arm rear-side connecting portion 37, which is connected to the second arm 32, at a predetermined location rearward of the bearing portion 36. Specifically, the first arm rear-side connecting portion 37 has a connecting shaft 37*a* which extends in the left-right direction with respective opposite ends thereof protruding outward from the left and right side surfaces of the arm body 33. The opposite ends of the connecting shaft 37*a* are engaged with connecting recesses 45*b* and 45*b* of a second arm front-side connecting portion 45, referred to hereinafter, of the second arm 32.

The two weights 34 and 34 formed as elongated and narrow plates are mounted on a weight mounting portion 38, which is a rear portion of the arm body 33, in a state sandwiching the weight mounting portion 38. Note that each weight 34 is made of a material (metal such as iron) having a larger specific gravity than the arm body 33, and is formed e.g. by pressing a metal plate into a predetermined shape.

The second arm 32 is formed as a resin molded article having a predetermined shape by injection molding of the same resin material as that of the arm body 33 of the first arm 31. The second arm 32 is shorter than the first arm 31 and extends a predetermined length in the front-rear direction. Further, the second arm 32 has a bearing portion 41 having a C shape open forward in side view at about a longitudinal center thereof. The bearing portion 41 is pivotally engaged with an associated one of the second pivot shafts 19*a* of the keyboard chassis 4.

Further, the second arm 32 has a rear portion thereof provided with a second arm rear-side connecting portion 42 connected to the key rear-side connecting portion 23 of the white key 2*a*. The second arm rear-side connecting portion 42 is formed into a bifurcated shape, and has two left and right connecting arm portions 43 and 43 which extend a predetermined length parallel to each other along the longitudinal direction of the second arm 32. Each connecting arm portion 43 has a rear end thereof formed with a connecting hole 43*a* extending through the connecting arm portion 43 in the left-right direction. The two connecting arm portions 43 and 43 sandwich the connecting body portion 23*a* of the key rear-side connecting portion 23 of the white key 2*a* between the rear ends thereof from the left and the right, and each connecting hole 43*a* has an associated one of the engagement protrusions 23*b* of the key rear-side connecting portion 23 pivotally fitted therein.

Furthermore, the second arm 32 has a front portion thereof provided with the second arm front-side connecting portion 45 connected to the first arm rear-side connecting portion 37 of the first arm 31. The second arm front-side connecting portion 45 has a pair of left and right connecting portions 45*a* and 45*a* arranged with a predetermined spacing in the left-right direction. The connecting portions 45*a* and 45*a* are each formed with the connecting recess 45*b* which has a U shape having a slot-like shape in side view and open forward. The left and right connecting portions 45*a* and 45*a* of the second arm front-side connecting portion 45 are pivotally and slidably engaged with the respective opposite ends of the connecting shaft 37*a* of the first arm 31 via the connecting recesses 45*b* and 45*b* thereof.

Figure 5A:
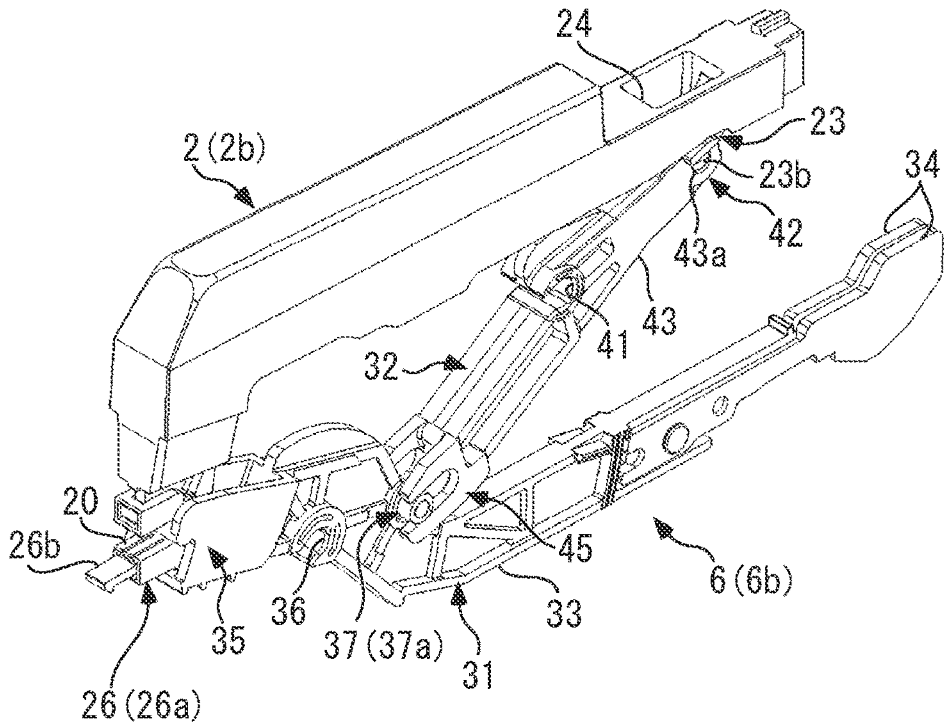
Figure 5B:
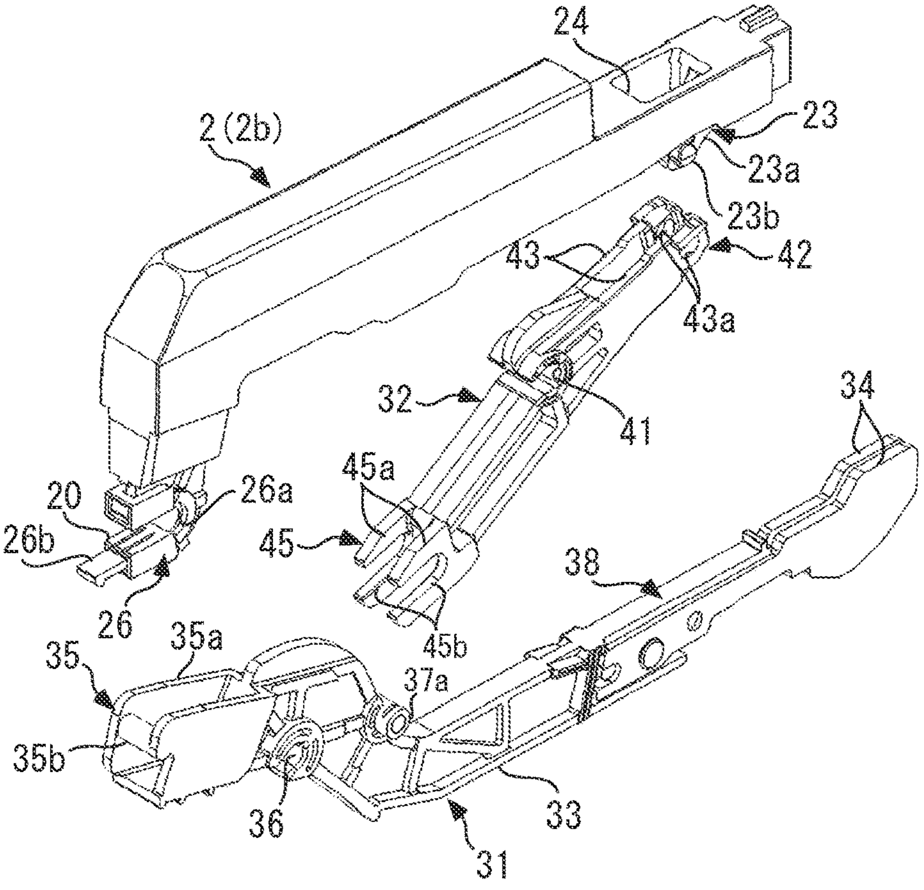

FIG. 5A shows the black key 2*b* and the key support mechanism 6*b* therefor on an enlarged scale, and FIG. 5B shows the black key 2*b* and the key support mechanism 6*b* in an exploded state. The black key 2*b* is formed e.g. by injection molding of the same resin material as that of the white key 2*a* into a hollow shape which extends in the front-rear direction by a predetermined length shorter than that of the white key 2*a* and opens downward. The black key 2*b* has a front-side lower end thereof provided with a key front-side connecting portion 26 formed substantially similar to the key front-side connecting portion 22 of the white key 2*a*. This key front-side connecting portion 26 has a connecting recess 26*a* which has a U shape having a slot-like shape in side view and open forward. Further, the key front-side connecting portion 26 has an extension portion 26*b* on a lower-side front end of the connecting recess 26*a*. The extension portion 26*b* extends a predetermined length forward of the front surface of the body of the black key 2*b*. This extension portion 26*b* functions as an upper limit position regulation portion of the black key 2*b*. Note that in the following description, the components of the black key 2*b* and the key support mechanism 6*b* having the same configurations as those of the above-described white key 2*a* and key support mechanism 6*a* are denoted by the same reference numerals and detailed description thereof will be omitted.

The key support mechanism 6*b* supporting the black key 2*b* is constructed substantially similar to the above-described white key-associated key support mechanism 6*a*. Specifically, the arm body 33 of the first arm 31 of the key support mechanism 6*b* and the second arm 32 of the same are constructed exactly similar in shape and size to the arm body 33 and the second arm 32 of the white key-associated key support mechanism 6*a*. Note that two left and right weights 34 and 34 of the black key-associated key support mechanism 6*b* differ from the weights 34 of the white key-associated key support mechanism 6*a* in the shape of the rear portion thereof.

Figure 6A:
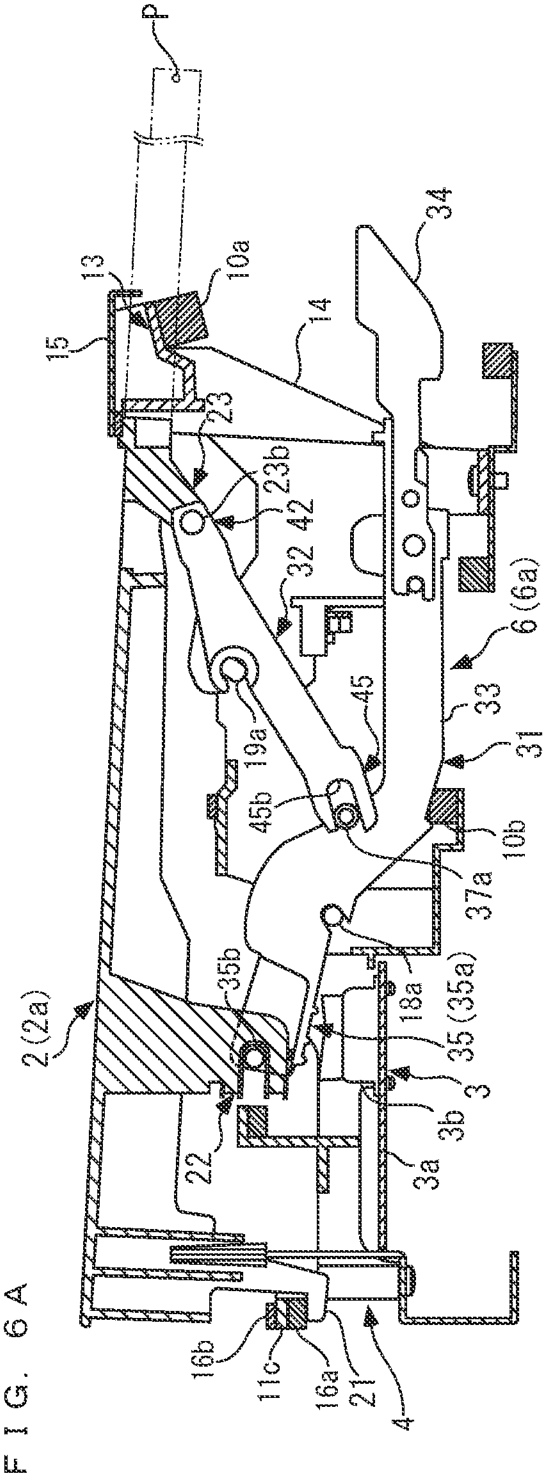
Figure 6B:
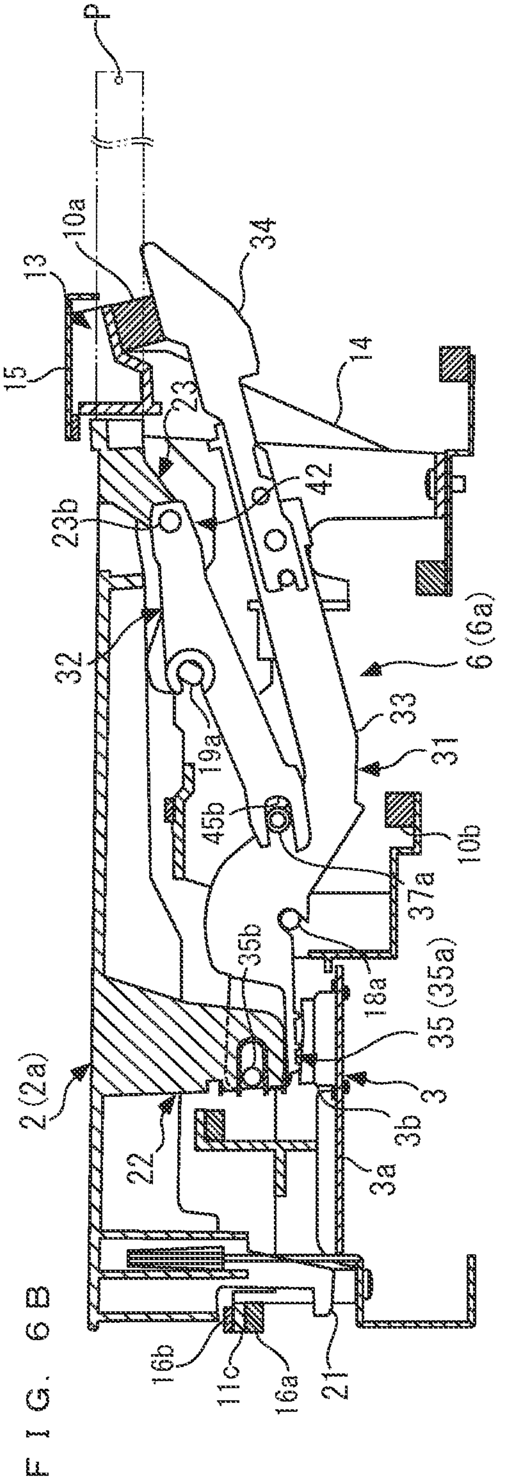
Figure 7A:
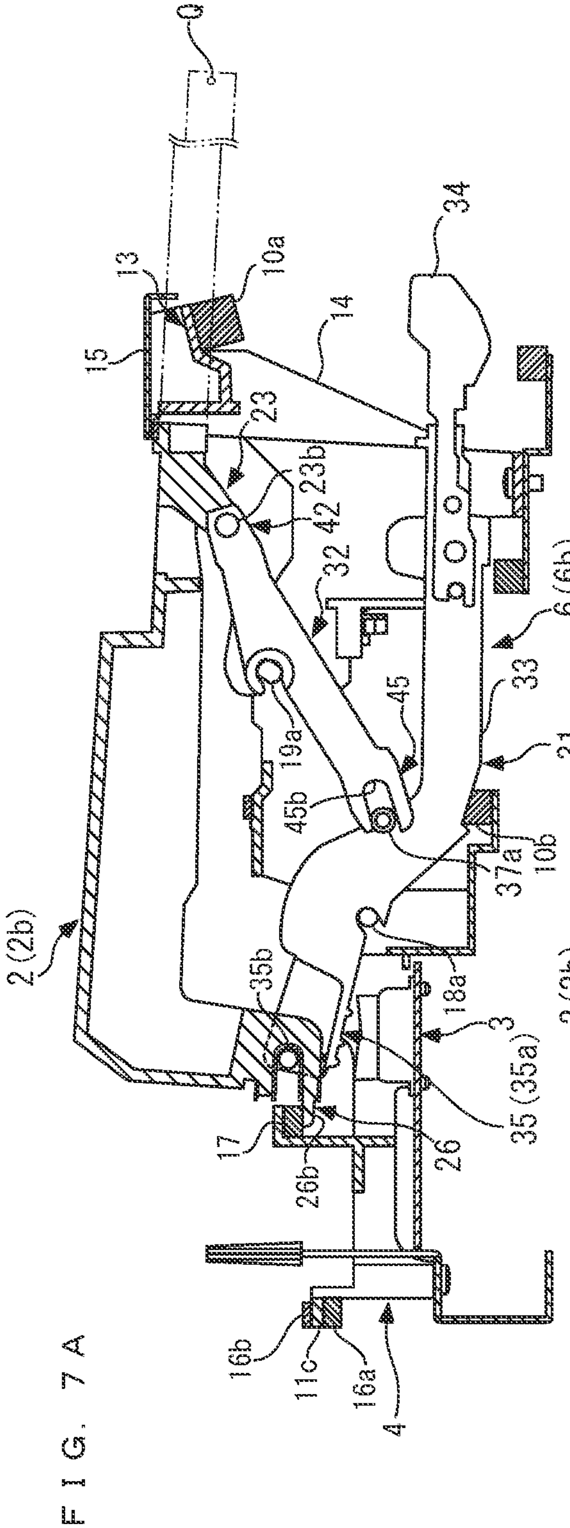
Figure 7B:
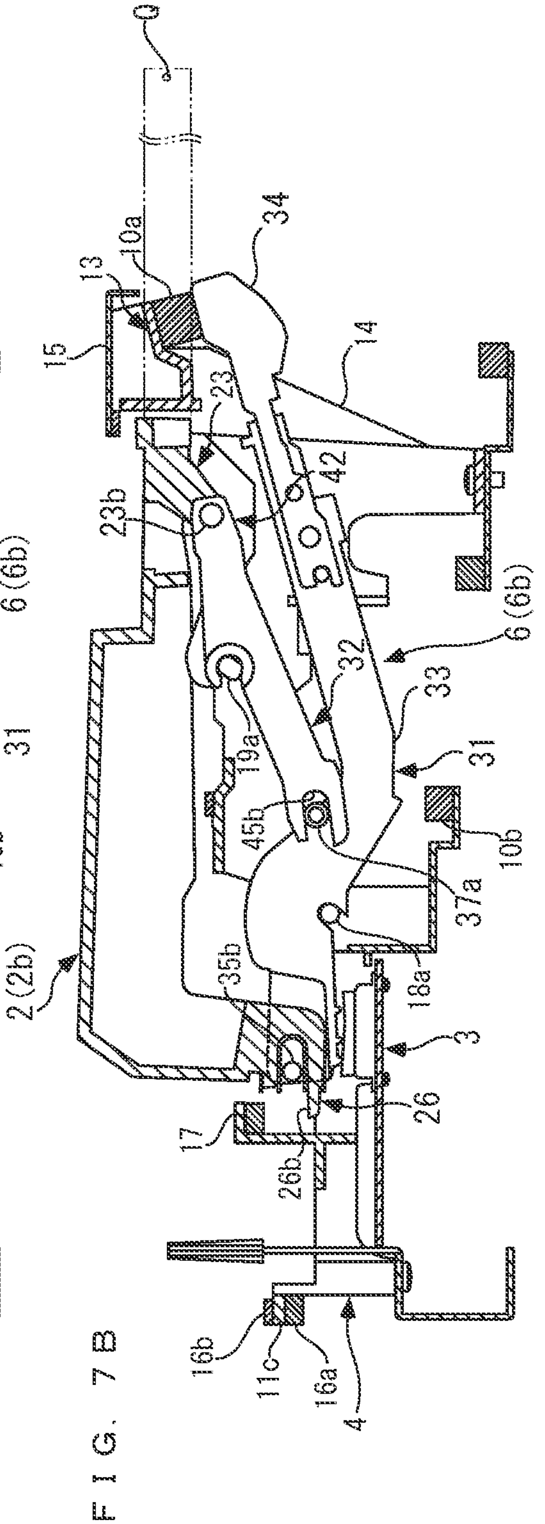

Next, a description will be given of the operation of the keys 2 and the key support mechanisms 6 of the keyboard device 1 constructed as described above. FIGS. 6A and 6B are views useful in explaining the operation of the white key 2*a* and the key support mechanism 6*a* associated therewith. FIGS. 7A and 7B are views useful in explaining the operation of the black key 2*b* and the key support mechanism 6*b* associated therewith.

When the front end of the white key 2*a* is depressed by a player with his/her finger from a key-released state shown in FIG. 6A, the key front-side connecting portion 22 of the white key 2*a* moves downward, whereby the first arm 31 is pivotally moved in a counterclockwise direction about the first pivot shaft 18*a*. Further, in accordance with the pivotal movement of the first arm 31, the second arm front-side connecting portion 45, which is engaged with the connecting shaft 37*a* of the first arm 31 via the connecting recesses 45*b* and 45*b*, moves upward. With this, the second arm 32 is pivotally moved in a clockwise direction about the second pivot shaft 19*a*. Then, in accordance with this pivotal movement of the second arm 32, the key rear-side connecting portion 23, which is connected to the second arm 32 via the second arm rear-side connecting portion 42 formed at the rear end of the second arm 32, is pulled down, whereby the rear end of the white key 2*a* is moved downward.

Note that during the above-mentioned pivotal movement of the first arm 31, the box portion 35*a* of the first arm front-side connecting portion 35 moves downward, and accordingly, the switch body 3*b* of one of the key switches 3, which is associated with the depressed key 2, is pressed from above by the bottom wall of the box portion 35*a*. As a consequence, in the electronic piano, key depression information of the depressed key 2 is detected, and based on the detected key depression information, sound is generated from a speaker, not shown.

As described hereinabove, in the case where the white key 2*a* is depressed, in accordance with the counterclockwise pivotal movement of the first arm 31, the weight 34 of the first arm 31 is tilted such that the weight 34 becomes higher as it extends rearward, whereby the rear end of the weight 34 is brought into contact with the first arm upper limit stopper 10*a* from below, as shown in FIG. 6B. This prevents further pivotal movement of the first arm 31. When the front end of the white key 2*a* is depressed to its lowest position, the front end of the white key 2*a* is brought into contact with the key lower limit stopper 16*b*, which blocks further depression of the white key 2*a*.

The white key 2*a* depressed as above operates such that it pivotally moves about a virtual pivot P located rearward of the rear end thereof. The location of the virtual pivot P is set such that a distance from the front end of the white key 2*a* becomes approximately twice as long as the length of the white key 2*a* itself, for example. With this, when the front end of the white key 2*a* is depressed to the lowest position, compared with the case where the white key 2*a* is in the key-released state shown in FIG. 6A, the front end of the white key 2*a* is located lower by a predetermined key stroke (e.g. 10 mm) and the rear end of the white key 2*a* is located lower by a distance (e.g. 5 mm), which is approximately half of the above key stroke.

On the other hand, when the finger is released from the white key 2*a* being depressed, the first arm 31 of the key support mechanism 6*a* pivotally moves in a direction opposite to the above-mentioned direction, by the own weight of the weight 34, and in accordance therewith, the second arm 32 as well pivotally moves in a direction opposite to the above-mentioned direction. In accordance with this pivotal movement of the second arm 32, the white key 2*a* pivotally moves upward about the virtual pivot P. Then, a predetermined portion of the first arm 31, rearward of the first pivot shaft 18*a*, moves into contact with the first arm lower limit stopper 10*b* from above, and both of the upper limit position regulation portions 21 and 21 of the white key 2*a* move into contact with the key upper limit stopper 16*a* from below, whereby further pivotal movement of the white key 2*a* is blocked, and the white key 2*a* returns to its original key-released state.

Further, operation in response to depression of the black key 2*b* is performed similar to the above-described operations of the white key 2*a* and the key support mechanism 6*a* in response to depression of the white key 2*a*. More specifically, when a front end of the black key 2*b* is depressed from a key-released state shown in FIG. 7A, the first arm 31 is pivotally moved in the counterclockwise direction about the first pivot shaft 18*a*, and the second arm 32 is pivotally moved in the clockwise direction about the second pivot shaft 19*a*. With this, the black key 2*b* operates such that it pivotally moves about a virtual pivot Q located rearward of the rear end thereof. Note that similar to the above-mentioned virtual pivot P of the white key 2*a*, the location of the virtual pivot Q is set such that a distance from the front end of the black key 2*b* becomes approximately twice as long as the length of the black key 2*b* itself, for example. Therefore, when the front end of the black key 2*b* is depressed to its lowest position, compared with a case where the black key 2*b* is in the key-released state shown in FIG. 7A, the front end of the black key 2*b* is located lower by a predetermined key stroke and the rear end thereof is located lower by a distance which is approximately half of the above key stroke.

On the other hand, when the finger is released from the black key 2*b* having been depressed, the first arm 31 and the second arm 32 of the key support mechanism 6*b* pivotally move in a direction opposite to the above-mentioned direction, and in accordance therewith, the black key 2*b* pivotally moves upward about the virtual pivot Q. Then, the extension portion 26*b* of the key front-side connecting portion 26 of the black key 2*b* moves into contact with the key upper limit stopper 17 from below, whereby further pivotal movement of the black key 2*b* is blocked, and the black key 2*b* returns to its original key-released state.

Next, the essential part of the present invention will be described with reference to FIGS. 8A to 10D. The essential part of the present invention is that a key rear-side stopper 51, with which the rear end of the key 2 moves into contact from below, is provided at the rear end of the keyboard chassis 4.

Figure 8A:
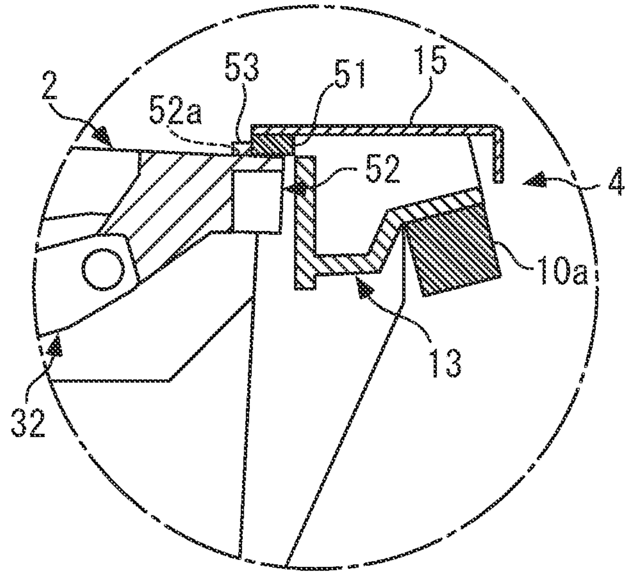
Figure 8B:
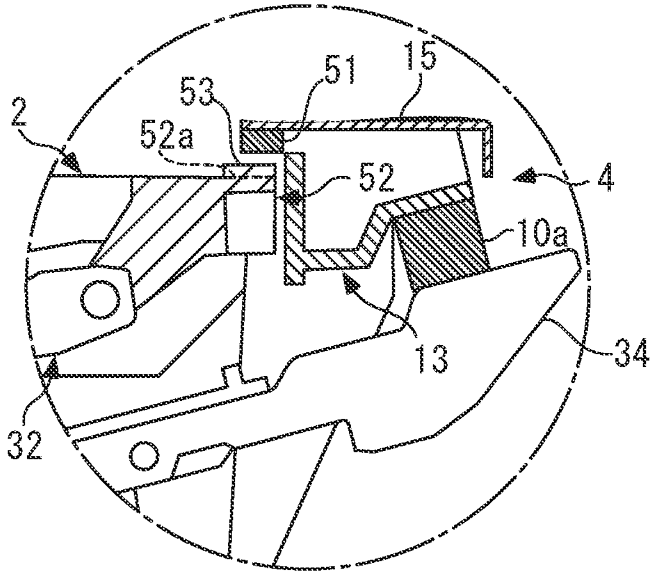

FIGS. 8A and 8B show the rear end, denoted by reference numeral 52, of the key 2 and component parts therearound, described hereinabove with reference to FIGS. 6A to 7B, on an enlarged scale. FIG. 8A shows a key-released state of the key 2 and FIG. 8B shows a key-depressed state of the same. As shown in FIGS. 8A and 8B, the key rear-side stopper 51 mentioned above is fixed by bonding to a front end of a lower surface of the above-described cover plate 15 (stopper support plate). The key rear-side stopper 51 is made of an elastic material and formed into a block shape which extends in the left-right direction along the entirety of the cover plate 15 and has a predetermined thickness in the vertical direction.

Figure 9A:
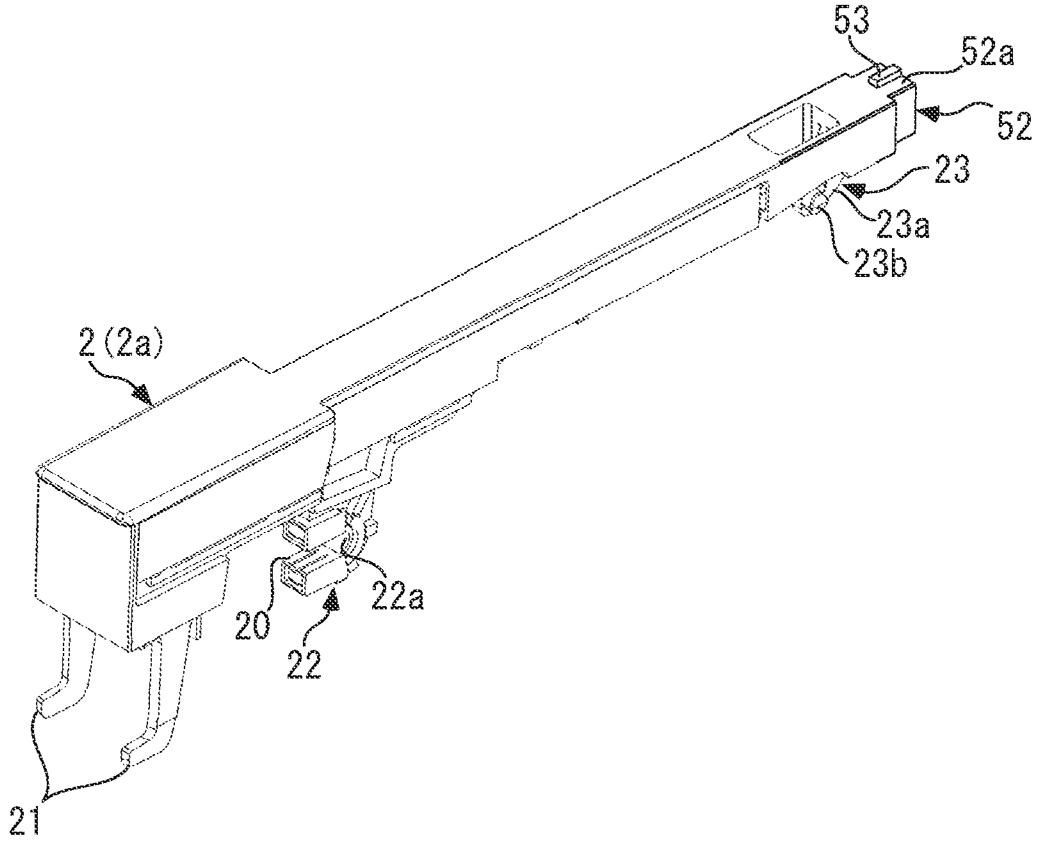
Figure 9B:
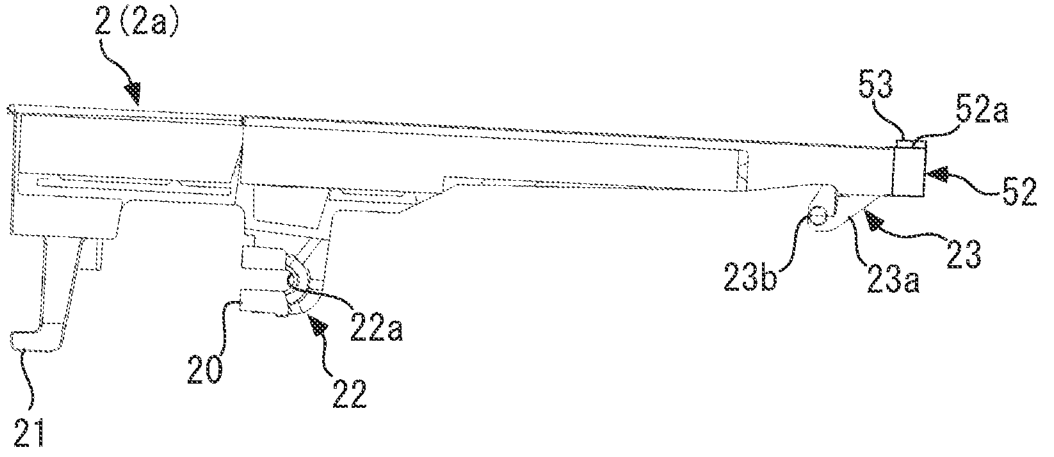

FIGS. 9A and 9B show the appearance of the white key 2*a*, in which FIG. 9A is a perspective view and FIG. 9B is a right side view. Note that the rear end 52 of the white key 2*a* and that of the black key 2*b* are constructed similar to each other, and therefore, the following description is given of the white key 2*a* regarded as a representative of the keys 2.

As shown in FIGS. 9A and 9B, the rear end 52 of the key 2 has a lateral width shorter than the width of a portion forward thereof. Further, the upper surface of the rear end 52 of the key 2 is integral with the upper surface of the key 2 itself, and forms a contact surface 52*a* which is in contact with the key rear-side stopper 51 from below, in the key-released state. Furthermore, the rear end 52 of the key 2 is provided with a protrusion 53 which extends along the longitudinal direction of the key 2 on the contact surface 52*a* and protrudes upward from the contact surface 52*a*. The upper surface of the protrusion 53 is formed in parallel with the contact surface 52*a*, and has a smaller area than the contact surface 52*a*.

Further, in the keyboard device 1, as shown in FIGS. 8A and 8B, the key rear-side stopper 51 is disposed via the cover plate 15 at a predetermined location above the chassis rear 13. As shown in FIG. 8A, in the key-released state, the contact surface 52*a* and the protrusion 53 at the rear end 52 of the key 2 are in contact with the key rear-side stopper 51 from below. On the other hand, as shown in FIG. 8B, in the key-depressed state, the rear end 52 of the key 2 moves downward, whereby the contact surface 52*a* and the protrusion 53 are downward separated from the key rear-side stopper 51.

When the key 2 depressed is released and returns to its original position where it was before the key depression, before the upper limit position regulation portions 21 and 21 of the front end of the key 2 move into contact with the key upper limit stopper 16*a* from below, the contact surface 52*a* of the rear end 52 of the key 2 moves into contact with the key rear-side stopper 51 from below. Further, in this case, before the contact surface 52*a* of the key 2 moves into contact with the key rear-side stopper 51, the protrusion 53 hits against the key rear-side stopper 51. Note that in the black key 2*b*, the above-described extension portion 26*b* and black key-associated upper limit stopper 17 correspond to the upper limit position regulation portion 21 and the key upper limit stopper 16*a* for the white key 2*a*, respectively.

As described heretofore, according to the keyboard device 1 to which the essential part of the present invention is applied, when the key 2 depressed returns to its original position where it was before the key depression, the upper limit position regulation portions 21 and 21 of the front end of the key 2 move into contact with the key upper limit stopper 16*a* after the rear end 52 of the key 2 moves into contact with the key rear-side stopper 51, and hence it is possible to reduce the speed and impact of the upper limit position regulation portions 21 and 21 of the key 2 when the upper limit position regulation portions 21 and 21 hit against the key upper limit stopper 16*a*. As a consequence, it is possible not only to largely reduce noise generated by the upper limit position regulation portions 21 and 21 hitting against the key upper limit stopper 16*a*, but also to promptly bring the key 2 having returned to its original position where it was before the key depression to a standstill. In addition, by promptly bringing the key 2 to a standstill, it is possible not only to improve string striking repeatability of the key 2 but also to obtain an excellent touch feeling.

Further, when the rear end 52 of the key 2 moves into contact with the key rear-side stopper 51 from below, the protrusion 53 hits against the key rear-side stopper 51 first, and then the contact surface 52*a* hits against the key rear-side stopper 51. More specifically, compared with a case where the contact surface 52*a* of the key 2 immediately hits against the key rear-side stopper 51, since the protrusion 53 having an upper surface with a smaller area than that of the contact surface 52*a* hits against the key rear-side stopper 51 first, it is possible to reduce impact noise generated when the rear end 52 of the key 2 hits against the key rear-side stopper 51.

Note that the present invention is not limited to the above-described embodiment, but it can be practiced in various forms. For example, although in the above-described embodiment, in the rear end 52 of the key 2, the upper surface of the protrusion 53 is formed in parallel with the contact surface 52*a*, the present invention is not limited to this, but it is possible to employ various shapes of the upper surface of the protrusion 53.

Figure 10A:
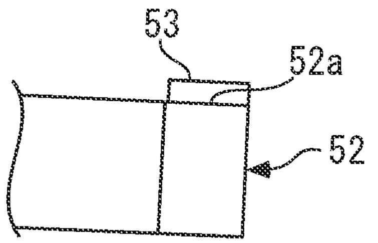
FIG. 10A is a right side view of the rear end of a key.
Figure 10B:
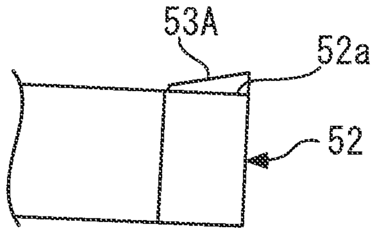
FIGS. 10B to 10D are views useful in explaining variations of a protrusion, respectively.
Figure 10C:
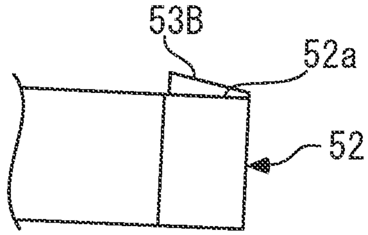
Figure 10D:
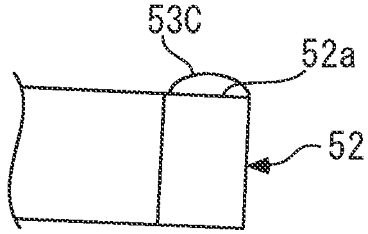

FIG. 10A is a right side view of the rear end 52 of the key 2 described above, whereas FIGS. 10B to 10D show variations of the protrusion 53, respectively. As shown in FIG. 10A, the above-mentioned upper surface of the protrusion 53 is formed in parallel with the contact surface 52*a*, whereas in a protrusion 53A shown in FIG. 10B, an upper surface thereof is sloped downward toward the front of the contact surface 52*a* (sloped downward to the left as viewed in FIG. 10B), and in a protrusion 53B shown in FIG. 10C, an upper surface thereof is sloped downward toward the rear of the contact surface 52*a* (sloped downward to the right as viewed in FIG. 10C). Further, in a protrusion 53C shown in FIG. 10D, an upper surface thereof is formed into an arcuate shape convex upward. When these protrusions 53A, 53B and 53C move into contact with the key rear-side stopper 51 from below, differently from the protrusion 53 of which the whole upper surface simultaneously moves into contact with the key rear-side stopper 51, the upper surfaces of the protrusions 53A, 53B and 53C progressively hit against the key rear-side stopper 51. With this, compared with the case where the protrusion 53 moves into contact with the key rear-side stopper 51, it is possible to further reduce impact noise.

Further, details of the constructions of the rear end 52 and the key rear-side stopper 51 of the key 2 shown in the embodiment are given only by way of example, and they can be modified as appropriate within the scope of the subject matter of the present invention.

What is claimed is:

1. A keyboard device for a keyboard instrument, comprising:
   - a keyboard chassis having an upper limit stopper;
   - a key extending a predetermined length in a front-rear direction and disposed above the keyboard chassis; and
   - a key support mechanism that is provided in a state engaged with the keyboard chassis, for supporting the key from below, and causes, upon depression of the key, the depressed key to operate such that the key pivotally moves about a virtual pivot located rearward of a rear end of the key, wherein the key includes an upper limit position regulation portion provided on a lower portion of a front end of the key, for regulating an upper limit position of the key by moving into contact with the upper limit stopper from below, in a key-released state, the keyboard device further comprising a key rear-side stopper provided on the keyboard chassis, for moving into contact with the rear end of the key from below before the upper limit position regulation portion moves into contact with the upper limit stopper, when the key returns to its original position where the key was before the key depression, wherein the rear end of the key includes:

a contact surface for moving into contact with the key rear-side stopper in the key-released state, and a protrusion formed to protrude upward from the contact surface.

2. The keyboard device according to claim 1, wherein the protrusion has an upper surface thereof sloped with respect to the contact surface or formed into an arcuate shape convex upward.

3. The keyboard device according to claim 1, further comprising a stopper support plate mounted on an upper portion of a rear end of the keyboard chassis, and wherein the key rear-side stopper is fixed to a front end of a lower surface of the stopper support plate.

* * * * *